Patented Sept. 18, 1934

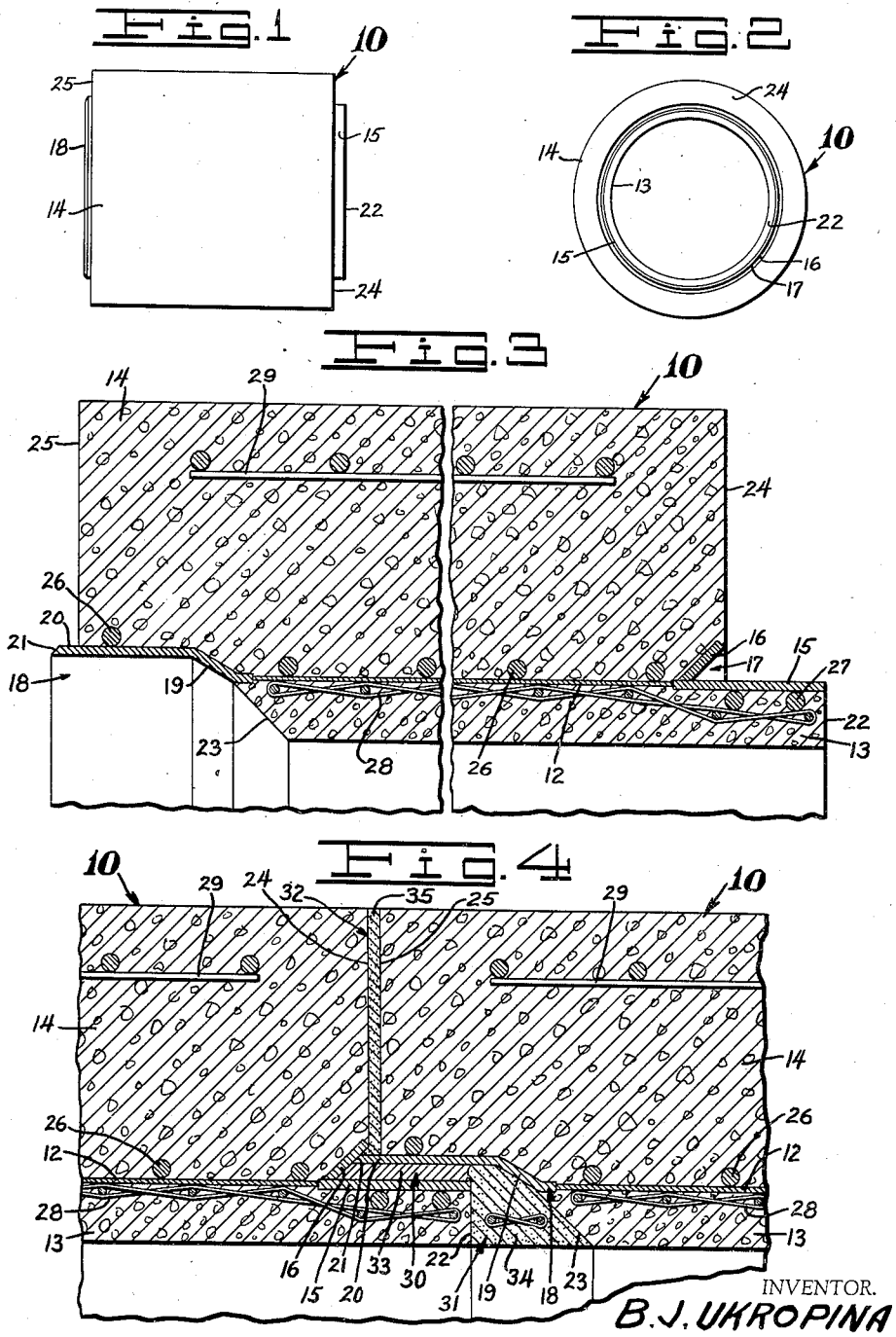

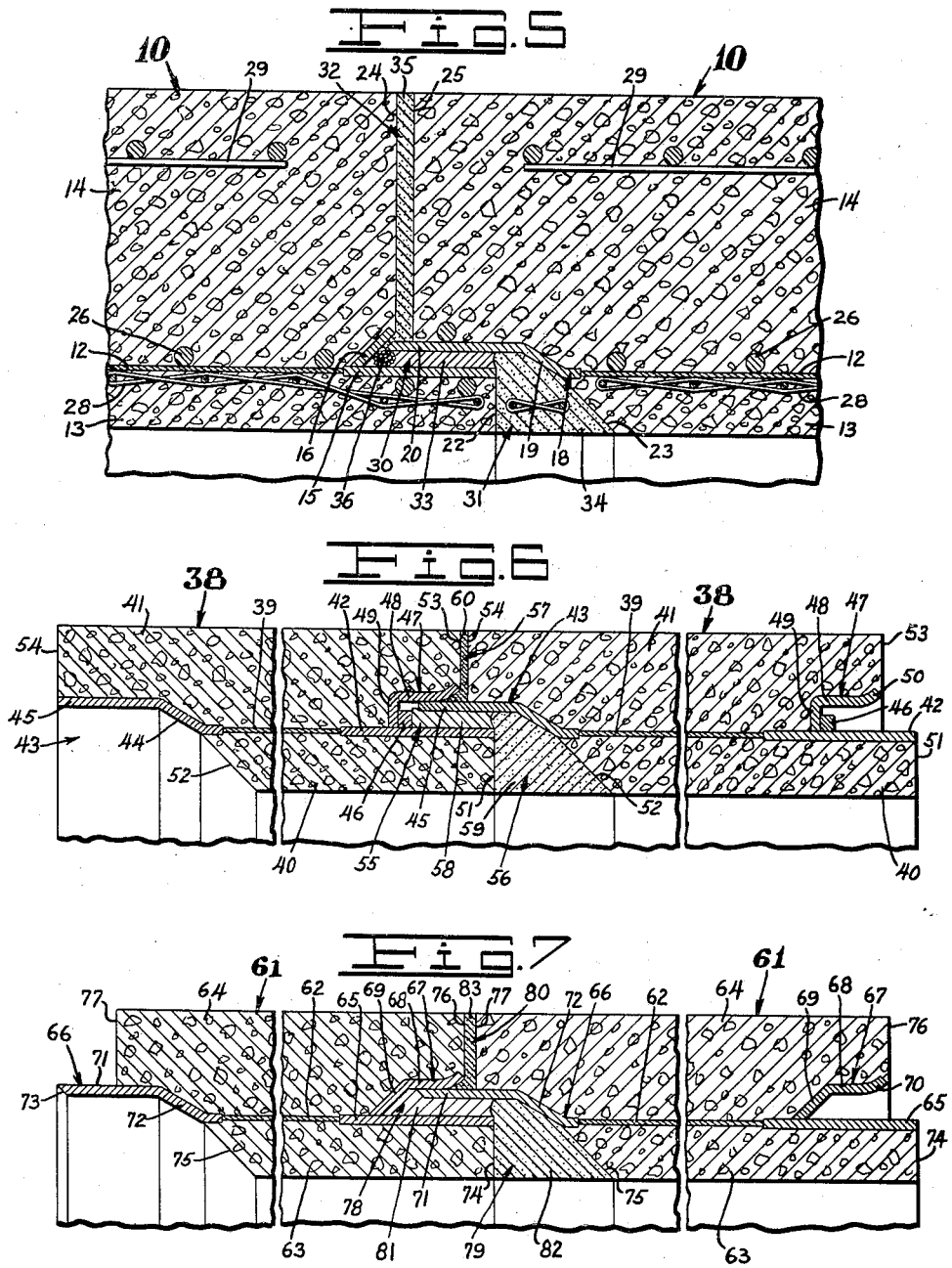

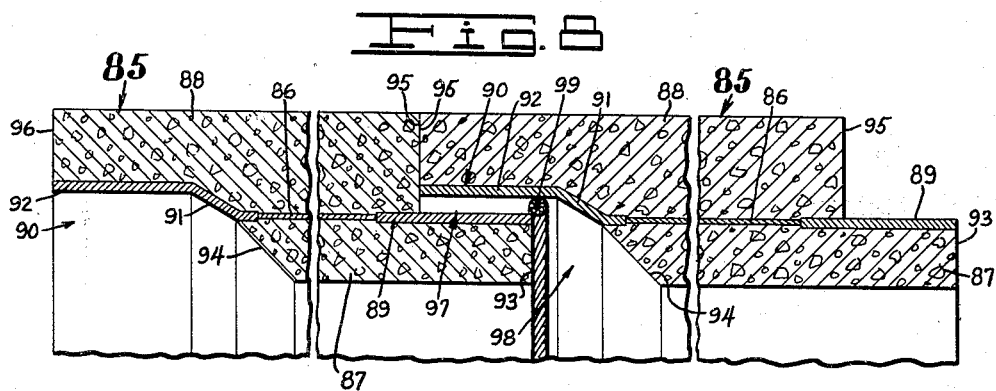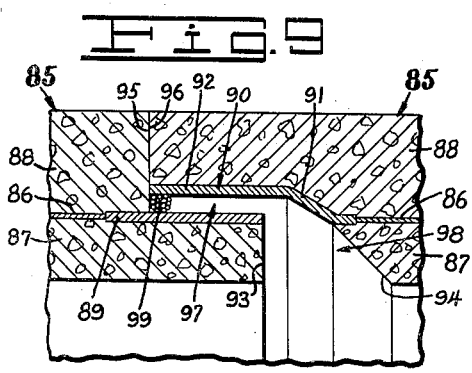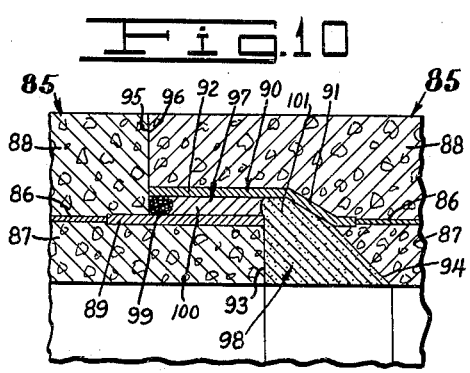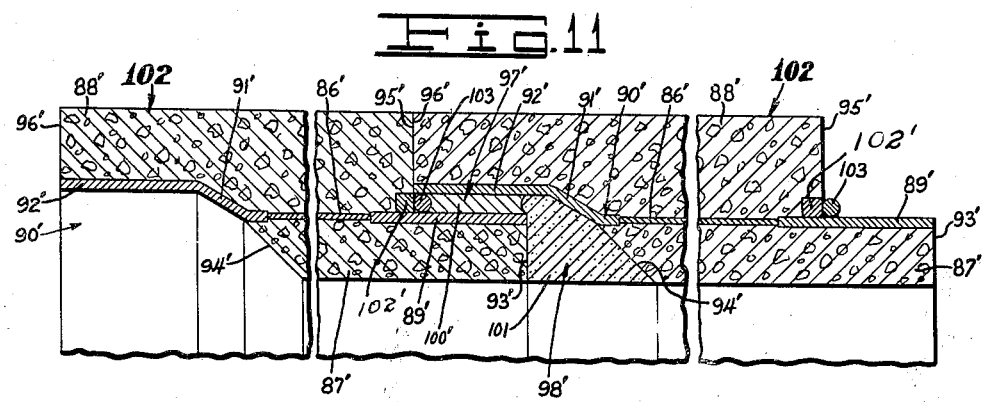

1,973,967

UNITED STATES PATENT OFFICE 1,973,967

CONCRETE PIPE JOINT

Bozidar J. Ukropina, Los Angeles, Calif.

Application November 20, 1933, Serial No. 698,814

4 Claims. (Cl. 285—112)

This invention relates to improvements in concrete pipes and joints therefor.

The general object of the invention is to provide an improved concrete pipe construction.

Another object of the invention is to provide an improved joint construction for joining two lengths of pipe.

A more specific object of my invention is to provide a concrete joint wherein the spigot end includes a bevelled centering member.

Other objects and the advantages of this invention will be apparent from the following description taken in connection with the accompanying drawings wherein:

Fig. 1 is a side elevation of a length of concrete pipe embodying the features of my invention;

Fig. 2 is an end view of the device shown in Fig. 1;

Fig. 3 is an enlarged fragmentary longitudinal section of my improved concrete pipe;

Fig. 4 is a view similar to Fig. 3 showing two lengths of my improved pipe joined together with my improved pipe joint;

Fig. 5 is a view similar to Fig. 4 showing a modified form of joint construction;

Fig. 6 is a fragmentary longitudinal section through a modified form of pipe;

Fig. 7 is a view similar to Fig. 6 showing a slightly modified form of joint;

Fig. 8 is a fragmentary longitudinal section through a further modified form of pipe showing one step in the forming of a joint;

Fig. 9 is a view similar to Fig. 8 showing another step in the forming of a joint;

Fig. 10 is a view similar to Fig. 9 showing the completed joint; and

Fig. 11 is a fragmentary longitudinal section through a still further modified form of pipe.

Referring to the drawings by reference characters I have indicated my improved concrete pipe generally at 10. As shown the pipe 10 comprises a metal reinforcing cylinder 12 embedded between an inner layer of concrete 13 and an outer layer of concrete 14. At one end the cylinder 12 includes a spigot ring 15 which is made of thicker metal than the cylinder and is shown as butt welded thereto. Spaced from the outer end of the spigot ring 15 I provide on the outer face thereof a band of metal 16 which is welded to the spigot ring and is inclined outward towards the adjacent end of the pipe thus forming an angular recess 17 around the spigot ring.

At the end of the cylinder 12 opposite the spigot ring 15 I provide a bell ring 18 which like the spigot ring is made of thicker metal than the cylinder and is butt welded thereto. Adjacent its inner end the bell ring includes an outwardly flared shoulder 19 which merges into an enlarged portion 20 the inner diameter of which is greater than the outer diameter of the spigot ring 15.

The outer end of the portion 20 of the bell ring is preferably beveled as at 21 at an angle corresponding to the angle of the band 16 on the spigot ring.

The end of the inner layer of concrete 13 adjacent the spigot ring 15 is shown as terminating flush with the outer layer of the spigot ring as at 22 while the end of the inner layer of concrete adjacent the bell ring 18 is set back from the outer end of the bell ring and terminates in a beveled face 23, the outer end of which engages the bell ring adjacent the inner end of the bell ring shoulder 19.

The outer layer of concrete 14 adjacent the spigot ring 15 terminates flush with the outer end of the metal band 16 as at 24 while the end adjacent the bell ring 18 is set back a short distance from the outer end of the bell ring as at 25.

Surrounding the cylinder 12 and the bell ring 18 I preferably provide a plurality of reinforcing bars 26 which are spot welded thereto and similar bars 27 are spot welded to the inner face of the spigot ring 15. I may also provide a wire reinforcing cage 28 which is spot welded to the inner face of the cylinder 12 and the bars 27. Embedded in the outer layer of concrete 14 intermediate the outer surface thereof and the cylinder 12 I provide a metal reinforcing cage 29.

When two lengths of the pipe 10 are joined the spigot ring 15 of one pipe is positioned in the bell ring 18 of the other pipe and the pipes are moved together until the end of the bell ring is positioned in the recess 17 and the tapered end 21 of the bell ring engages the band 16 on the spigot ring as shown in Fig. 4.

It will thus be seen that a portion of the bell end enters the spigot end of an adjoining length. When the pipes are thus joined a tubular chamber 30 is formed between the spigot ring 15 and the bell ring 18. This tubular chamber has cylindrical inner and outer walls without protuberances or beads thereon. A chamber 31 is also formed between the end 22 of the inner layer of concrete of one pipe and the end 23 of the inner layer of concrete of the other pipe. Furthermore a chamber 32 is formed between the end 24 of the outer layer of concrete of one pipe and the end 25 of the other pipe.

After the pipes are thus joined a caulking material 33, such as lead, is driven in the chamber 30 between the smooth wall of the band 16 and the smooth outer end of the spigot ring. Thereafter a fill material 34, such as cement mortar, is positioned in the chamber 31 and a similar fill material 35 is positioned in the chamber 32.

In Fig. 5 I have shown a slightly modified form of joint construction for use in connecting two lengths of the pipe 10. When forming this joint two lengths of pipe are laid end to end as previously described and then a rope or cable 36 which may be made of a plurality of flexible steel wires or lead is driven in the chamber 30 up to the band 16. Then the caulking material 33 is driven in the chamber between the rope 36 and the outer end of the spigot ring and thereafter the fill materials 34 and 35 are positioned in their respective chambers as previously described.

In Fig. 6 I have indicated a modified form of concrete pipe generally at 38. As shown the pipe 38 like the pipe 10 comprises a metal reinforcing cylinder 39 embedded between an inner layer of concrete 40 and an outer layer of concrete 41. At one end the cylinder 39 includes a spigot ring 42 which is made of thicker metal than the cylinder and is butt welded thereto and at the opposite end of the cylinder I provide a bell ring 43 which is likewise made of thicker metal than the cylinder and is butt welded thereto. As shown the bell ring includes a tapered shoulder 44 and an enlarged end section 45 the inner diameter of which is greater than the outer diameter of the spigot ring 42.

Positioned inward from the outer end of the spigot ring I provide on the outer surface thereof an annular metal band 46 which is preferably spot welded to the spigot ring. The outer diameter of the band 46 is approximately the same as the inner diameter of the section 45 of the bell ring. Surrounding the spigot ring 42 a metal bell ring 47 which includes a section 48 is coaxial with the spigot ring and a disk-like section 49 which is spot welded to the spigot ring adjacent the inward face of the band 46. The outer end of the section 48 is set back from the outer end of the spigot ring 42 and is preferably outwardly flared, as at 50. The inner diameter of the section 48 is greater than the outer diameter of the section 45 of the bell ring 43.

The end of the inner layer of concrete 40 adjacent the spigot ring 42 terminates flush with the outer end of the spigot ring as at 51 while the opposite end is set back from the outer end of the bell ring and terminates in a bevelled surface 52, the outer end of which engages the inner end of the bell shoulder 44.

The end of the outer layer of concrete 41 adjacent the spigot ring 42 is set back from the end thereof and terminates flush with the outer end of the ring 47, as at 53, while the opposite end terminates flush with the outer end of the bell ring 43 as at 54.

When the two lengths of the pipe 38 are joined the spigot ring 42 of one pipe is positioned in the bell ring 43 of the other pipe and the two pipes are moved together until the outer end of the bell ring is positioned adjacent to but out of engagement with the band 46. In this position a portion of the section 45 of the bell ring 43 is telescoped in the ring 47. When the pipes are thus joined a chamber 55 is formed between the spigot ring 42 and the bell ring 43. Furthermore, a chamber 56 is formed between the end 51 of the inner layer of concrete of one pipe and the end 52 of the inner layer of concrete of the other pipe and a chamber 57 is formed between the end 53 of the outer layer of concrete of one pipe and the end 54 of the outer layer of concrete of the other pipe.

After the pipes are thus joined a caulking material 58, such as lead, is positioned in the chamber 55 between the band 46 and the outer end of the spigot ring 42 and thereafter a fill material 59 such as cement mortar is positioned in the chamber 56 and a similar fill material 60 is positioned in the chamber 57.

In Fig. 7 I have indicated another modified form of concrete pipe generally at 61. As shown the pipe 61 is similar in most respects to the pipe 38 and comprises a metal reinforcing cylinder 62 embedded between an inner layer of concrete 63 and an outer layer of concrete 64. At one end of the cylinder 62 I provide a spigot ring 65 which is made of thicker metal than the cylinder and is butt welded thereto. At the opposite end of the cylinder I provide a bell ring 66 which like the spigot ring is made of thicker metal than the cylinder and is butt welded to the cylinder.

Surrounding the spigot ring 65 I provide a metal bell ring 67 which includes a section 68 which is coaxial with the spigot ring 65 and an inwardly inclined section 69 the inner end of which is spaced from the outer end of the spigot ring and is spot-welded thereto. The outer end of the section 68 of the ring 67 is set back from the outer end of the spigot ring 65 and is outwardly flared as at 70.

The bell ring 66 includes an enlarged end section 71 and an inclined shoulder 72. The inner diameter of the bell section 71 is greater than the outer diameter of the spigot ring 65 while the outer diameter of the bell ring section is less than the inner diameter of the section 68 of the ring 67. The outer end of the bell ring 66 is preferably beveled as at 73.

The end of the inner layer of concrete 63 adjacent the spigot ring 65 terminates flush with the outer end of the spigot ring as at 74, and the opposite end is set back from the outer end of the bell ring and terminates in a beveled face 75, the outer end of which engages the inner end of the bell shoulder 72. The end of the outer layer of concrete 64 adjacent the spigot ring is set back from the outer end of the spigot ring and terminates flush with the outer end of the ring 67 as at 76 and the opposite end is set back from the outer end of the bell ring as at 77.

When two lengths of the pipe 61 are joined the spigot ring 65 of one pipe is positioned in the bell ring 66 of the other pipe and the two pipes moved together until the end 73 of the bell ring is spaced a short distance from the tapered section 69 of the ring 67 as shown. In this position a portion of the bell ring 66 is telescoped into the section 68 of the ring 67. When the pipes are thus joined a chamber 78 is formed between the bell and spigot rings and a chamber 79 is formed between the inner layers of concrete and a chamber 80 is formed between the outer layers of concrete.

After the pipes are thus joined a caulking material, such as lead, is positioned in the chamber 78 between the tapered section 69 of the ring 67 and the outer end of the spigot ring 65. Thereafter, a fill material 82 such as cement mortar is positioned in the chamber 79 and a similar fill material 83 is positioned in the chamber 80.

In Figs. 8, 9 and 10 I have indicated a further modified form of concrete pipe generally at 85. As shown the pipe 85 comprises a metal reinforcing cylinder 86 embedded between an inner layer of concrete 87 and an outer layer of concrete 88. At one end of the cylinder 86 I provide a spigot ring 89 which is made of thicker metal than the cylinder and is butt welded thereto and at the opposite end of the cylinder I provide a bell ring 90 which like the spigot ring is made of thicker metal than the cylinder and is butt welded thereto. The bell ring includes an inclined shoulder 91 and an enlarged end section 92, the inside diameter of which is greater than the outside diameter of the spigot ring 89.

The end of the inner layer of concrete 87 adjacent the spigot ring 89 terminates flush with the outer end of the spigot ring as at 93 and the opposite end is set back from the outer end of the bell ring 90 and terminates in a beveled face 94 the outer edge of which engages the inner end of the tapered shoulder 91 of the bell ring. The end of the outer layer of concrete adjacent the spigot ring is set back from the outer end of the spigot ring as at 95 and the opposite end terminates flush with the outer end of the bell ring as at 96.

When the two lengths of the pipe 85 are to be joined the spigot ring 89 of one pipe is positioned in the bell ring 90 of the other pipe and the two pipes moved together until the end 96 of the outer layer of concrete of one pipe engages the end 95 of the outer layer of concrete of the other pipe. In this position a chamber 97 is formed between the bell and spigot rings and a chamber 98 is formed between the adjacent ends 93 and 94 of the inner layers of concrete.

When the lengths are thus joined an annular rope member 99 which is made of lead or is a steel cable is driven into the chamber 97 until it engages the face 95 as shown in Fig. 9. A caulking material 100 such as lead is then driven in the chamber 97 between the rope 99 and the outer end of the spigot ring 89 as shown in Fig. 10. Thereafter a fill material 101 such as cement mortar is positioned in the chamber 98.

In Fig. 11 I have indicated a still further modified form of concrete pipe generally at 102. As shown the pipe 102 is similar in most respects to the pipe 85 and like portions thereof are indicated by similarly primed reference characters. In the pipe 102 I may arrange a ring or band 102' which extends about each spigot ring 89' and is secured thereto as by welding. This ring 102' preferably has an outside diameter which is not greater than the inside diameter of the bell ring 92'. Also in this type I may employ a solid metal band 103 which is positioned on the spigot 89' adjacent the face 95' of the outer layer of concrete before two sections of the pipe are joined. As shown the band 103 is circular in cross section and is spot welded to the spigot ring but it may be of any cross sectional configuration desired and may be positioned on the spigot ring without securing it thereto. The outer diameter of the band 103 is slightly less than the inside diameter of the bell ring section 92' so that when two sections of the pipe are joined the band 103 will telescope within the bell ring. After the pipes are thus joined the caulking material 100 is driven into the chamber 97' between the band 103 and the outer end of the spigot ring and then the fill material 101' is positioned in the chamber 89'. It will be understood that either the ring 102' or the band 103 may be used or omitted depending on the requirements in each installation.

From the foregoing description it will be apparent that I have provided a novel concrete pipe construction and joint for connecting two lengths of the pipe which is simple in construction and highly efficient in use.

Having thus described my invention, I claim:

1. In a conduit comprising a plurality of lengths of concrete pipe laid end to end, each of said lengths including a bell section at one end and a reduced spigot section at the opposite end, said bell section having a metal lining therein and said spigot section having a metal band thereon, each of said spigot bands having a metal collar thereon with one end of said collar engaging said band and secured thereto at a point spaced inward from the outer end of said band and the opposite end of said collar being spaced from said band whereby said collar forms a recess in the spigot end face of said pipe with the outer end of said collar spaced inward from the outer end of said band, said pipes being laid with said spigot sections telescoped within said bell sections and said bell sections positioned in said recesses formed by said collars, and caulking material positioned in the space between adjacent bell and spigot sections.

2. A length of concrete pipe including a bell section at one end and a reduced spigot section at the opposite end, said bell section having a metal lining therein and said spigot section having a metal band thereon and a metal reinforcing member connecting said bell lining and said spigot band, said spigot band having a metal collar thereon, said collar being spaced from the outer end of said band and being secured thereto, the outer face of said collar being inclined outward to form a recess in the spigot end of said pipe between said spigot band and said collar and the outer end of said collar being spaced from the outer end of said band.

3. A conduit comprising a plurality of lengths of concrete pipe laid end to end, each of said lengths including a bell section at one end and a reduced spigot section at the opposite end, each of said bell sections having a metal lining therein and each of said spigot sections having a metal band thereon, each of said spigot bands having a metal collar thereon with one end of said collar engaging said band and secured thereto at a point spaced inward from the outer end of said band and the opposite end of said collar being spaced from said band whereby said collar forms a recess in the spigot end face of said pipe and the outer end of said collar being spaced inward from the outer end of said band, said pipes being laid with said spigot sections telescoped in said bell sections and with said bell sections positioned in said recesses formed by said collars, a compressible annular metal band positioned on each of said spigot bands and spaced from the outer ends of said spigot bands, and a caulking material positioned in the space between adjacent bell and spigot sections.

4. A conduit comprising a plurality of lengths of concrete pipe laid end to end, each of said lengths including a metal reinforcing cylinder embedded between an inner layer of concrete and an outer layer of concrete, said cylinder including a bell section at one end and a spigot section at the opposite end, said spigot sections each having a metal collar thereon spaced from the outer end of said spigot section, said collar being secured to said spigot section, said collar including a cylindrical body having a tapered outer face to form a recess between the collar and the outer surface of said spigot section, said lengths being laid with the spigot of one pipe telescoped in the bell section of the adjacent pipe and with the bell sections positioned in said recesses formed by said collars and a caulking material in the space between adjacent bell and spigot sections.

BOZIDAR J. UKROPINA.